June 3, 1952 R. A. AUSTIN 2,599,218
ROLL END GUIDE
Filed Jan. 14, 1949 2 SHEETS—SHEET 1

INVENTOR
RUSSELL A. AUSTIN
BY Oldham & Oldham
ATTORNEY

INVENTOR.
RUSSELL A. AUSTIN

Patented June 3, 1952

2,599,218

UNITED STATES PATENT OFFICE 2,599,218

ROLL END GUIDE

Russell A. Austin, Alliance, Ohio, assignor to Adamson United Company, Akron, Ohio, a corporation of Ohio Application January 14, 1949, Serial No. 70,965

3 Claims. (Cl. 18—2)

This invention relates to guides or baffle plates associated with the ends of a cooperating pair of rolls to prevent the escape between or into the journal boxes for the rolls of material being worked between the rolls, and, more particularly, is concerned with means of the type described for use with warming, mixing, or refining mills for handling plastic, rubber, and the like.

Heretofore, various provisions have been made in association with mill rolls, or the like, for preventing the escape of stock into or between the roll bearings during the mixing and refining thereof. Such means have taken the form of guides, baffles, plows, or the like associated with the ends of the rolls. However, substantially all of the roll end guides with which I am familiar from my work in the roll industry for a considerable period of years are open to the objection that they do not adequately confine the stock and keep it on or between the rolls. The stock tends to work out past the ends of the rolls to fall in the pit of the apparatus where the stock is contaminated, or the stock works into the journal bearings of the rolls, or both. The described action is particularly true in refiners for rubber reclaim in which high pressures and speeds are applied to the stock. In addition, known guides have been difficult to adjust, or require continual manual adjustment in order to prevent excessive wear on the guides or rolls as wear on the roll journals and bearings develops.

It is the general object of my invention to avoid and overcome the foregoing and other difficulties of and objections to known roll end guides by the provision of improved means of this type which are relatively inexpensive, easily adjusted, and which substantially prevent movement of stock being worked by the rolls between or into the journal bearings for the rolls.

Another object of my invention is the provision of roll end guides comprising a pair of main guide shoes of any of various types which are provided with overlapping guide plates which extend completely into the bight of the roll and which are adjustably mounted on the main guide shoes.

Another object of my invention is the provision of overlapping guide plates of the type described including wedges positioned on the front and rear of the guide plates and having portions curved complementary to the contour of the rolls.

The foregoing objects of my invention, and other objects which will become apparent as the description proceeds, are achieved by the provision in combination of a frame, a pair of rolls rotatably supported in the frame with substantially parallel axes and positioned to form a bight between the rolls, a guide supported on the journal bearings of the frame and associated with each roll end and having a curved edge in engagement with the roll, and overlapping plates adjustably supported on the guides and extending into the bight of the roll. Usually a wedge is associated with each plate and extends into the bight, one of the wedges being on the back and one on the front of the plates, and with the ends of the wedges being curved substantially to the contour of the rolls. Additionally, a plow may be adjustably and resiliently supported on each guide away from the bight of the rolls, with the plow being adapted to engage with the roll end. The guides may be of any of several types, for example, fixed; or resiliently mounted for tilting movement in a plane perpendicular to the axis of the associated roll; or pivotally mounted for swinging movement out of a plane perpendicular to the axis of the associated roll.

For a better understanding of my invention, reference should be had to the accompanying drawings, wherein.

The invention is particularly adapted for use with a rubber reclaim refining mill, and, hence, has been so illustrated and will be so described. However, it should be particularly understood that the improved roll end guides of my invention can be utilized with rolls of various types and employed in a wide variety of operations including cooperating rolls for working, mixing, warming, and sheeting of rubber, plastic, and the like.

Additionally, the invention is adapted for use with various types of main guide shoes, such as shoes mounted on the journal bearings and merely adjustable to and from the rolls but held in fixed relation after adjustment, main guide shoes which can be tilted out of a plane substantially perpendicular to the roll axes to facilitate cleaning behind the guide shoes, and with guide shoes held resiliently in contact with the rolls and mounted for tilting or rocking movement substantially in a plane perpendicular to the roll axes. For purposes of example and illustration the invention is illustrated and will be described in conjunction with a resiliently positioned rocker-type main guide shoes although such specific guide shoes form no part per se of the present invention which obviously is applicable to main guide shoes of the various known types.

More particularly, and having direct reference to the drawings, the numeral 10 indicates generally a rubber refining mill including a pair of cooperating rolls 12 and 14. These rolls are usually of slightly different diameter, in the manner shown, are positioned with their axes parallel to each other, and usually are adjustable to and from each other to control the clearance between the rolls. One of the rolls is generally driven at a greater surface speed than the other to assist in the mixing, masticating, and reclaiming action. Also, one or both of the rolls may be formed with surface ribs or grooves (not shown) if desired. Also, the rolls may be appropriately warmed or cooled by means which are not shown and which form no part of the present invention.

Each of the rolls 12 and 14 are formed with reduced diameter roll necks or journals which are appropriately supported in known manner in journal bearings 16 carried in the frame of the mill. The journal bearings 16 are capable of being moved toward and from each other in known fashion and by means not shown to control the distance between the rolls 12 and 14.

Figure 5:
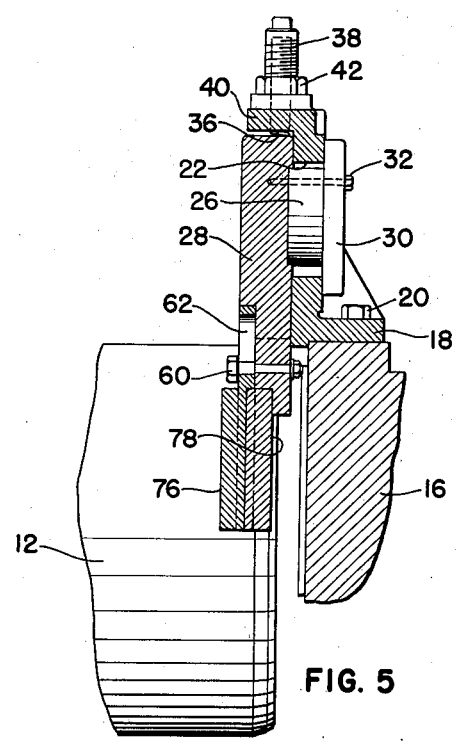
Fig. 5 is a vertical longitudinal sectional view taken substantially on line V—V of Fig. 1.

Mounted on top of each journal bearing 16 is a bracket 18 which is secured to the journal bearing, for example, by bolts 20. Each bracket 18 has a window 22 formed therein, the sides 24 of the window being substantially vertical, in the embodiment of the invention shown, and parallel to each other to provide guide ways parallel to a radius of the roll with which the bracket is associated. Slidably received between the guide ways 24 is a round bearing 26 which is secured between a main guide or shoe 28, and a plate 30 by means of bolts 32, as best seen in Fig. 5.

In this manner, the main guide 28 is mounted for movement in a radial direction toward and from the roll with which the bracket is associated, and, in addition, the main guide 28 is free to tilt or rock in a plane perpendicular to the axis of the roll. The bottom of the main guide 28, that is, the edge of the guide nearest to the roll, is formed with an arcuate, curved portion 35 which is substantially to the curve of the roll and which engages with the roll surface.

The main guide 28 is resiliently urged with controllable pressure into contact with the roll, and this is accomplished by means of a compression spring 36 received within a hollow stud 38 which is threaded into a tapped opening in a flange 40 formed integral with and at right angles to the top of the bracket 18. The bottom of the compression spring 36 engages with the top of the main guide 28 in the manner best seen in Fig. 1. A lock nut 42 secures the stud bolt 38 in the adjusted position.

Figures 1, 2:
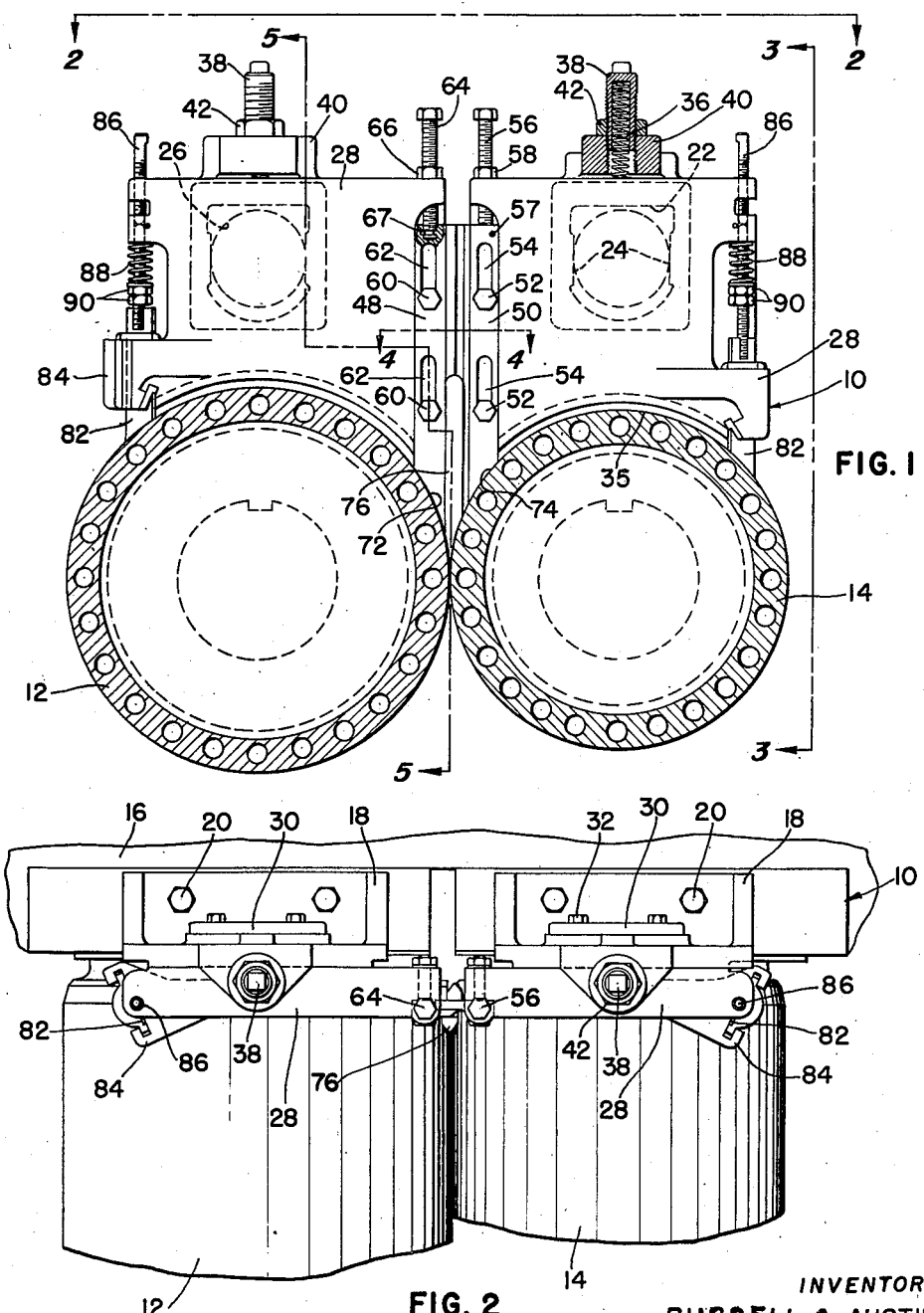
Fig. 1 is a vertical transverse sectional view through a pair of cooperating rolls and illustrating the roll guide assembly comprising one specific embodiment of the invention wherein the assembly is associated with resiliently mounted tilting guides.
Fig. 2 is a plan view of the apparatus illustrated in Fig. 1.
Figure 3:
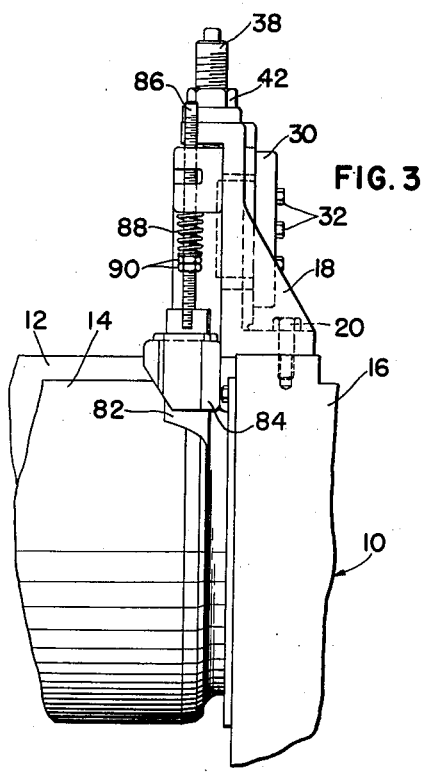
Fig. 3 is a front elevational view of the apparatus of Fig. 1 taken substantially on line III—III thereof.
Figure 4:
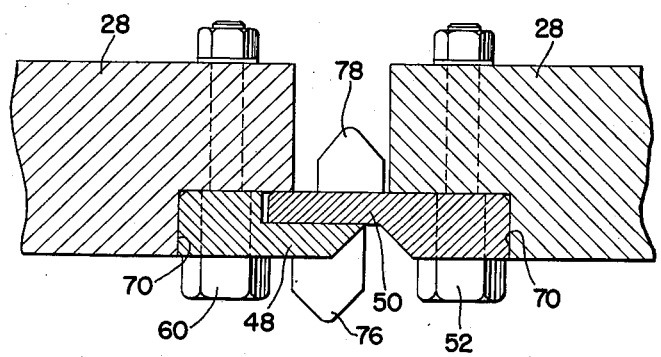
Fig. 4 is an enlarged fragmentary horizontal cross-sectional view taken substantially on line IV—IV of Fig. 1.

Associated with each main guide assembly as just described are split guide plates 48 and 50, as best seen in Figs. 1 and 4. The split guide plate 50 is adjustably mounted on the edge of the main guide 28 most closely adjacent to the cooperating main guide, and this is accomplished by means of bolts 52 which are secured to the edge of the main guide 28 and which are received in slots 54 in the split guide 50. A stud bolt 56 extending through a tapped hole in the upper corner of the main guide 28 is rotatably secured in the upper end of the split guide 50, as by a pin 57 in the split guide extending through a groove in the end of the stud bolt 56, and a lock nut 58 is provided to secure the split guide 50 in its adjusted position.

In a like manner, bolts 60 extend through the associated main guide 28, slots 62 are provided in the split guide 48, and a stud bolt 64, including a lock nut 66 controls the vertical position of the split guide 48. A locking pin 67 rotatably secures the stud bolt 64 to the split guide plate 48.

As best seen in Fig. 4, the split guides 48 and 50 are conveniently received in grooves 70 formed in the edges of the main guides 28. This figure of the drawing also illustrates the manner in which the split guides 48 and 50 overlap each other so as to adequately fill the space between the rocker guides 28 even though these guides are adjusted, together with the rolls 12 and 14, toward or from each other during or before the use of the apparatus. Also, each one of the split guides 48 and 50 extends down into the bight between the rolls 12 and 14, all in the manner best illustrated in Figs. 1 and 5. The bottom portions of the split guides 48 and 50 are curved, as at 72 and 74, respectively, to the arcuate contour of the roll 12 and 14.

In order to additionally strengthen the split guides 48 and 50, and to provide a greater bearing surface between the split guides and the rolls, each of the split guides 48 and 50 is provided with a wedge-like strengthening rib indicated, respectively, by the numerals 76 and 78. It will be seen that the wedge-shaped strengthening rib 76 is on the front of the split guide 48, whereas the wedge-shaped strengthening rib 78 is on the back of the split guide 50. The lower ends of the wedge-like strengthening ribs 76 and 78 are appropriately contoured to substantially engage with the roll surfaces in the very bight of the roll.

In addition to providing the split guides 48 and 50 between the rocker guides 28, I may also provide each main guide 28 with a knife or plow. A typical plow is indicated by the numeral 82, the plow being contoured to engage with the extreme end of its associated roll, and extends somewhat around the end of the roll in the manner illustrated in the drawings. The plow 82 is slidably supported for substantially vertical movement in the embodiment of the invention illustrated, that is, for movement in a direction substantially parallel to a radius of the associated roll, by supporting the plow in a bracket 84 formed integral with or secured to the main guide 28. A screw 86, a compression spring 88, and adjustable nuts 90 control the resilient pressure with which the plow 82 is forced against the roll.

It is believed that the operation of my improved guide assembly will be understood from the foregoing description. Suffice it to say here that the rolls 12 and 14 can be adjusted to and from each other with the split guides 48 and 50 permitting this adjustment. The split guides 48 and 50 can be readily adjusted as to their position in the bight of the rolls by loosening the bolts 52 and 60 and adjusting the stud bolts 56 and 64 whereupon the bolts 62 and 60 are retightened. The pressure exerted by the plows 82 can be controlled by means of adjustment of the nuts 90 on the bolts 86. In every position of operation of the guides, the main guides 28 are resiliently urged with a controlled resilient action, by springs 36 against the rolls. The pressure of the springs 36 can be adjusted by means of the hollow studs 38. The main guides 28 are free for movement to and from the surface of the rolls, and these guides may rock in planes perpendicular to the axis of the roll. The wedge ribs 76 and 78 extend into the innermost bight of the rolls.

The result is that the entire roll end guide assembly very closely follows the ends of the rolls and closes the roll ends to prevent the escape of material being worked by the rolls. Passage of the material being worked into the journal bearings of the rolls or out into the pit or onto the floor is substantially eliminated, and this is true regardless of the spacing between the rolls, which spacing is usually relatively small and once adjusted is not often changed.

From the foregoing, it will be recognized that the various objects of my invention have been achieved by the provision of a relatively simple, easily adjusted, and continuously operable roll end guide for rubber reclaiming mills and the like. My improved apparatus is initially relatively inexpensive, and requires substantially no maintenance, but functions over long periods of time in substantially leak-proof manner.

While certain representative embodiments and details have been shown for the purpose of illustrating the invention, it will be apparent to those skilled in this art that various changes and modifications may be made therein without departing from the spirit or scope of the invention.

I claim:

1. The combination in a mill, or the like, of a pair of rolls having journals, journal bearings for the journals, brackets supported in fixed relation to the journal bearings, a main guide carried by each bracket and having a portion curved to the contour of and engaging with an end of the roll, means for moving each main guide into engagement with its roll, a plow carried by the end of the main guide remote from the adjacent guide, adjustable pressure spring means for engaging each plow with a roll end adjacent the roll journal, and a pair of split guides overlapping in a plane transverse to the rolls and extending down into the bight between the rolls, one of the split guides being secured adjustably to one of the main guides and being movable towards and from the rolls, and the other split guide being secured adjustably to the other of the main guides and being movable towards and from the rolls.

2. The combination in a mill, or the like, of a pair of rolls having journals, journal bearings for the journals, brackets supported in fixed relation to the journal bearings, a main guide carried by each bracket and having a portion curved to the contour of and engaging with an end of the roll, means mounting the main guide for movement to and from the roll and for tilting of the guide in a plane transverse to the roll, yieldable, adjustable pressure spring means for moving each main guide into engagement with its roll, and a pair of split guides overlapping in a plane transverse to the rolls and extending down into the bight between the rolls, one of the split guides being secured adjustably to one of the main guides, and the other split guide being secured adjustably to the other of the main guides, the split guides being secured to the main guides by means providing adjustment of the split guides only in a direction normal to the axis of the rolls.

3. The combination of a frame, a pair of rolls rotatably supported in the frame with substantially parallel axes and positioned to form a bight between the rolls, a guide supported on the frame and associated with each roll end and having a curved edge in engagement with the roll, adjustable means resiliently urging the guide into engagement with the roll, means mounting the guide for rocking movement in a plane substantially perpendicular to the axis of the roll, a plow adjustably and resiliently supported on each guide and engaging with the roll end, overlapping plates adjustably supported on the guides and extending into the bight of the rolls, and a wedge-shaped rib carried by each plate and extending into the bight, one of the ribs being on the back and one on front of the plates, the ends of the ribs being curved substantially to the contour of the rolls.

RUSSELL A. AUSTIN.

REFERENCES CITED

The following references are of record in the file of this patent:

UNITED STATES PATENTS

| Number | Name | Date |
| --- | --- | --- |
| 1,340,234 | Little | May 18, 1920 |
| 1,538,179 | Dixon | May 19, 1925 |
| 2,308,972 | Hasson | Jan. 19, 1943 |
| 2,513,541 | Winegar et al. | July 4, 1950 |